April 9, 1963  J. DRABECK ET AL  3,085,188
POWER-VALVE REACTOR, PARTICULARLY FOR MAGNETICALLY
CONTROLLED POWER RECTIFIERS
Filed March 4, 1958  3 Sheets-Sheet 1

April 9, 1963 J. DRABECK ET AL 3,085,188
POWER-VALVE REACTOR, PARTICULARLY FOR MAGNETICALLY
CONTROLLED POWER RECTIFIERS
Filed March 4, 1958 3 Sheets-Sheet 2

United States Patent Office 3,085,188
Patented Apr. 9, 1963

3,085,188
POWER-VALVE REACTOR, PARTICULARLY FOR MAGNETICALLY CONTROLLED POWER RECTIFIERS
Josef Drabeck, Nurnberg, and Wilhelm Kafka, Tennenlohe, near Erlangen, Germany, assignors to Siemens-Schuckertwerke Aktiengesellschaft, Berlin-Siemensstadt, Germany, a corporation of Germany
Filed Mar. 4, 1958, Ser. No. 719,089
Claims priority, application Germany Mar. 5, 1957
8 Claims. (Cl. 321—8)

Our invention relates to saturable-core reactors for high current-carrying duty and, in a more particular aspect, to magnetically controllable power rectifiers whose controlling components consist of such saturable reactors.

Direct-current supply assemblies for high power output, as required in electric power distribution systems, have been composed of dry-rectifier units connected by transformers to an alternating-current line in series with saturable reactors which control the rectified output voltage, the dry rectifiers co-acting with the reactors in an internal feedback circuit to provide for self-saturation of the reactors. The saturable reactors have been mounted in a separate oil tank requiring a considerable expenditure in material and space. Any attempt at doing away with such tanks by mounting reactors of the known design into the oil tank of the power transformers encounters considerable difficulty due to the fact that the high-duty power conductors extending within the tank between the transformer and the saturable reactors and the conductor entrance bushings cause additional electric losses and excessive heating of the components, particularly the walls of the tank. The same problem, generally, applies to other high-power valve-reactor systems; that is, saturable reactors connected in series with electric valves (diodes), inasmuch as the great cross sections required of the electric conductors in such power translating devices necessitate minimizing the space requirements and providing a simple overall construction.

It is an object of our invention to overcome the above-mentioned difficulties and to permit mounting the saturable reactors into the same oil tank that also houses the co-acting other high-power components, particularly the transformers and/or the rectifying devices.

To this end, and in accordance with the feature of our invention, the high-power reactance winding of the reactors in such systems is formed by a rod-shaped conductor which, at least in part, forms an electric connection necessary in the reactor circuit; and the saturable core of the reactor is formed of a substantially sleeve-shaped iron body of relatively small outer diameter consisting of ferro-magnetic material of an approximately rectangular magnetizing characteristic. This not only secures the above-mentioned improvement, but has also the advantage of greatly reducing the copper requirements for the reactors. The iron core may consist of a single piece or of several annular core components and, in both cases, is preferably wound up from tape material without waste. The length of the core for a given inner and outer diameter depends upon the iron cross section required.

According to another feature of our invention, relating to high-power dry rectifiers energized from a line transformer and controlled by saturable reactors, the "windings" or reactance conductors for the reactors consist preferably of the connecting leads between the high-current secondary winding of the transformer and the conductor bushings on the one hand, or the corresponding leads between the transformer high-current winding and the rectifier units, the saturable transformers being housed within the oil tank of the transformer. Only short intermediate portions of these connecting leads need be left available for mounting or fastening purposes. The connecting leads, forming the conductors of the reactors, may be formed as an interiorly bare copper tube traversed by oil, or these conductors may be formed of flat bars.

In cases where the apparatus serves for the control of relatively great voltages so that a large iron cross section is required for the single active winding of the transformer, it is preferable to connect the rod-shaped conductors with the high-current winding of the transformer on the side remote from the entrance openings or bushings of the transformer tank. In this case almost the entire height of the transformer is available for accommodating the reactor core so that the required iron cross section is attainable with a small exterior diameter of the core, the inner diameter being determined by the dimensions of the rod-shaped conductor.

The control windings of the reactors, normally energized by direct current of controllable voltage, may be wound onto the individual annular cores, or they may be wound onto the entire core arrangement as a whole. These control windings are preferably made of flat conductors, for instance of rectangular cross section. Since the reactor-rectifier connection is of the self-saturating type, only relatively few turns of control windings are required. The demand for copper as well as the space requirements of the control windings are further reduced by using a core material having a substantially rectangular magnetizing characteristic. It is possible in such apparatus, to connect the control windings of the individual reactor cores in known manner with the control windings of the reactors of different phases in series, in such a manner that the voltages induced in the respective control windings cancel each other for each individual saturable reactor. Relatively small control currents are sufficient so that the induced voltages do not have a high potential at any point of the control windings. Hence an only slight insulation of the control windings is sufficient. This contributes toward reducing the inner diameter of the annular core.

The invention is also applicable, to particularly great advantage, for those valve-reactor assemblies, generally of the magnetic amplifier type, that are voltage-integral controlled, i.e. are self-saturating without the aid of any control winding on the reactor core. In this case, the iron tape may be wound directly onto the insulated conductor of the reactor, thus further minimizing the space requirements. The insulating material of the conductor must be capable of withstanding the annealing temperature to which the iron is usually subjected after being wound onto the conductor structure. Suitable for this purpose are mica or other heat resistant insulators known for similar purposes.

In apparatus according to the invention as described so far, the inductive effect of the high-current conductors, which as explained form the "winding" or reactance conductor of the reactors, may commence imposing itself upon the exteriorly located construction components and the tank wall as soon as the iron of the respective annular reactor cores reaches the saturation range. This may cause additional electric losses. For keeping such losses at a minimum, it is preferable, according to another feature of our invention, to subdivide each saturable reactor, above a given rated current intensity, into several parallel connected component reactors, and to combine the component reactors of different respective phases into such spacial groups that the total current of each group is a constant direct current value or is equal to zero. For example, with three-phase current, three or six conductors may thus be grouped together; or for single-phase operation, the incoming and outgoing leads may thus be grouped. Such grouping is also applicable if the individual reactors in the respective phases are not sub-divided.

The above-mentioned and other objects, advantages and features of our invention will be apparent from, and will be set forth in, the following description in conjunction with the embodiments illustrated by way of example on the accompanying drawings in which.

Figure 1:
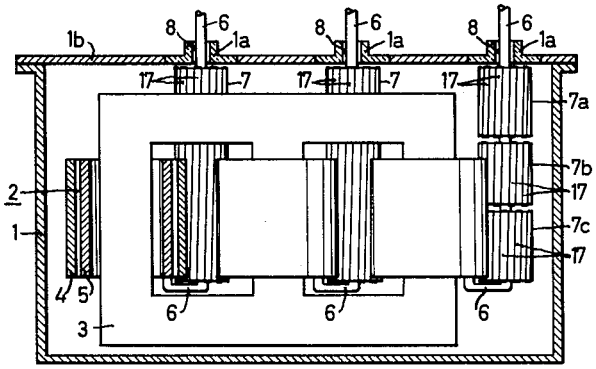
FIG. 1 shows schematically a partly sectional front view and FIG. 2 a schematic top view of a transformer-reactor apparatus according to the invention.
Figure 2:
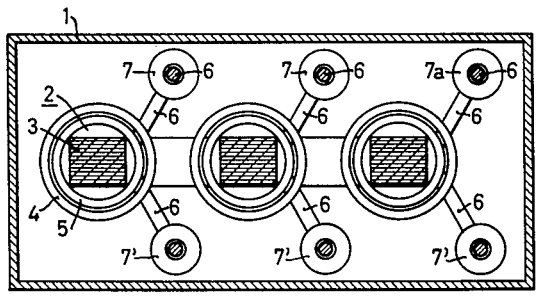

According to FIGS. 1 and 2, the oil tank 1 of the illustrated power transformer accommodates a power transformer composed of a three-legged core 3 with primary windings 4 and secondary windings 5. It is assumed that the voltage range to be controlled is rather high. For that reason, and as explained above, the rod-shaped conductors 6 are connected to the bottom side of the transformer secondary windings which upwardly are interconnected in star connection. Placed over the individual conductors 6 are annular iron cores 7 which consist of individual cores or sleeves. It will be noted that the entire length between the bottom end of each secondary winding and the inlet bushings 8 is available for the cores. Due to this great length of the individual reactors, the necessary amount of iron can readily be accommodated in the shape of a core of small outer diameter. As shown for one of the reactors in FIG. 1, the iron core may be subdivided into a plurality of portions 7a, 7b, 7c. The cores, regardless of whether they consist of a single body or are subdivided, are preferably of the tape-wound type as explained above and consist of a ferromagnetic material of substantially rectangular magnetizing characteristic such as the material available under the trade name "Trancor," for example.

The individual reactors are spacially arranged in two groups, one comprising the three reactors denoted by 7 and 7a in FIG. 2, and the other group comprising the other three reactors denoted by 7'. The in-lead bushings 8 on each side (FIG. 2) pass through a non-magnetic portion 1a (FIG. 1) of the cover 1b of the tank. A separate non-magnetic portion is preferably provided for each of the two groups.

The electric interconnection of the transformer and the reactors with the valve or rectifier members (diodes) is apparent from the examples of circuit diagrams shown in FIGS. 3 to 7. The above-described grouping of the various reactors is indicated in FIGS. 3 to 7 by broken-line enclosures. In FIGS. 3 to 7 the secondary windings of the transformer are denoted by 5 as in FIGS. 1 and 2. The reactors, each comprising an annular iron core 7 and a rod-shaped conductor 6 that form an interconnection between a transformer winding and a valve member, are denoted by 6, 7. The valve members are denoted by 13, an iron-cored smoothing reactor by 14, and the output terminals of the apparatus by 15 or 16. The reactors are shown equipped with a premagnetizing control winding 17 which is energized, for example, by direct current, from terminals 18.

Figure 3:
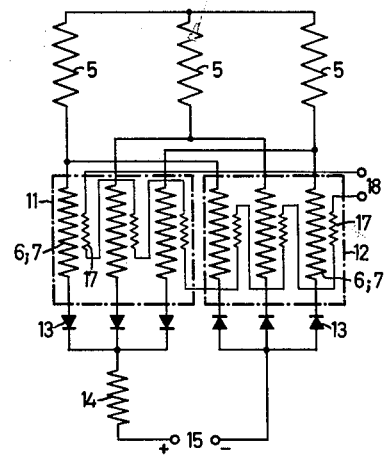
FIGS. 3 to 7 are schematic circuit diagrams of five respective direct-current supply assemblies, each consisting essentially of an A.-C. to D.-C. converting apparatus equipped with a transformer, rectifiers and saturable reactors according to the invention.

FIG. 3 represents a rectifier bridge connection without parallel branches, corresponding to FIGS. 1 and 2. Two reactors in series with two respective valve members 13 are provided for each of the three phases of the transformer circuit; and the reactors are grouped into two groups 11 and 12 as described in the foregoing.

Figure 4:
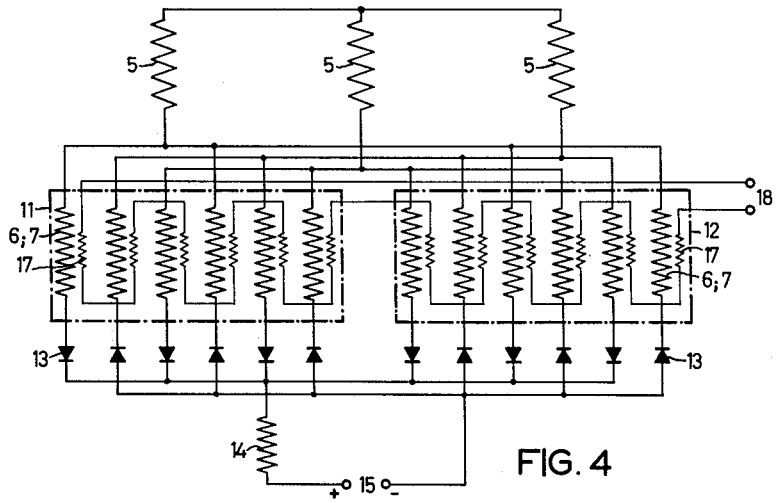

The rectifying system according to FIG. 4 includes a double parallel connection which comprises four reactors in series with four respective valves for each individual phase of the transformer, the reactors being arranged in two groups 11 and 12.

Figure 5:
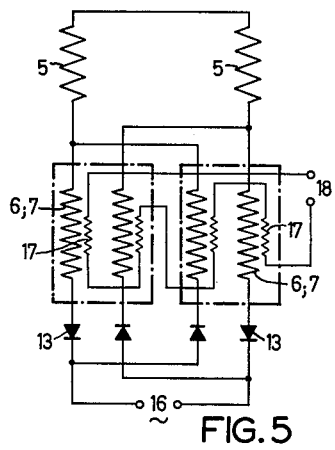

FIG. 5 shows a voltage-doubling connection with alternating-current output terminals 16. This apparatus serves for providing a voltage-controllable alternating-current output from a power supply of constant alternating voltage. The system comprises a total of four component reactors, each pair being connected in series with the other.

Figure 6:
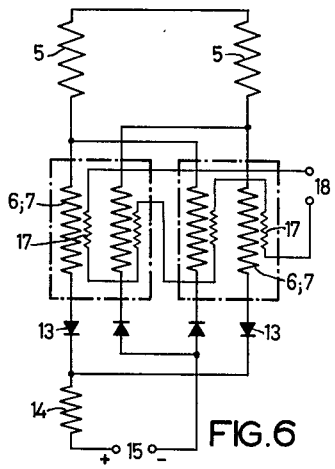
Figure 7:
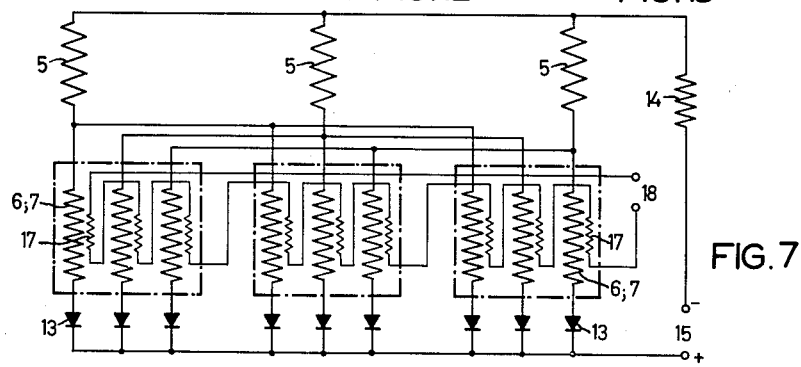

The system shown in FIG. 6 is essentially a single-phase rectifier in bridge connection. FIG. 7 illustrates a three-phase rectifier system in star connection.

As is apparent from FIG. 5, the invention is of advantage not only in rectifier systems but also in high-power equipment for alternating-current output controlled by saturable reactors in self-saturating connection.

The valves 13 connected in series with the saturable reactors 6, 7 may consist of silicon, germanium or selenium rectifier units. They may be mounted into the transformer tank together with the components described above with reference to FIGS. 1 and 2. Because of the high temperature of the cooling oil in the tank, it is often preferable to locate the rectifier units in the lower portion of the tank and hence in the range of lowest temperatures. In this case, the rectifier units are preferably connected between the transformer secondary windings and the saturable reactors. Such a connection departs from the diagrams of FIGS. 3 and 7 inasmuch as the valves are electrically connected between the transformer secondary windings 5 and the reactors 6, 7. The upper ends of the rod-shaped conductors are electrically connected with each other ahead of the output terminals or tank bushings so that a smaller number of such bushings is required on the high-power side of the apparatus. For example, in rectifier systems of this type, only the direct-current conductors need pass out of the tank through the bushings.

Figure 8:
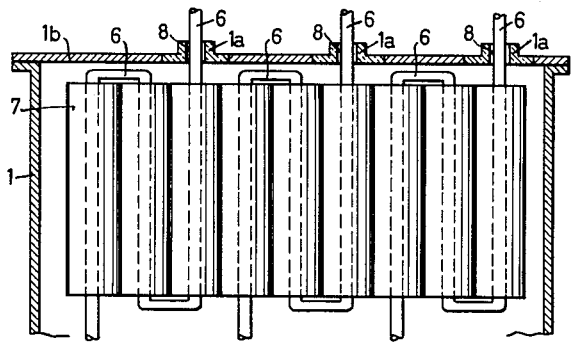
FIG. 8 is a schematic and partial front view and FIG. 9 a schematic and partial top view of a modified reactor portion appertaining to apparatus otherwise designed in accordance with any one of the preceding embodiments.
Figure 9:
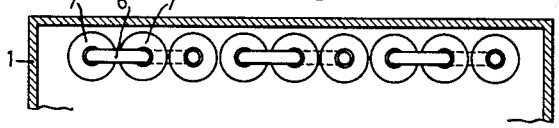

The modification illustrated in FIGS. 8 and 9 indicates schematically how the length of the iron core can be further increased where high voltages are to be controlled. For this purpose the rod-shaped conductors of the reactors are composed of individual parts in meander shape, each reactor portion having its own iron core. This further contributes to keep the outer diameter of the cores small.

Figures 10, 11:
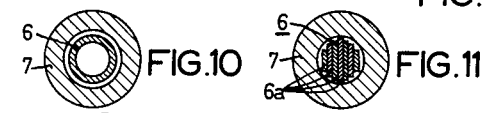
FIG. 10 is a cross section of a reactor with a tubular reactance conductor.
FIG. 11 shows a cross section of a reactor with a reactance conductor composed of flat bars.

According to FIG. 10, the reactance conductors 6 of the saturable reactors consist of copper tubes which may be traversed by cooling oil. However, these conductors may also be formed of copper bars as is apparent from the example of FIG. 11 where the conductor consists of a bundle of flat bars denoted by 6a.

Figures 12, 13:
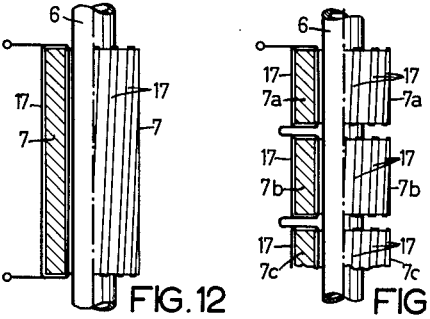
FIGS. 12 and 13 illustrate, partly in longitudinal section, two ways of mounting flat-wire premagnetizing windings on the reactor cores.
Figure 16:
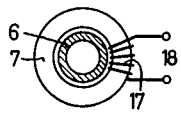
FIG. 16 is a cross section of a reactor having a control winding wound about only part of the reactor-core periphery.

The above-mentioned control windings 17 are preferably formed of copper tape which is wound about the magnet core 7 as illustrated in FIG. 12 or, in the case of a sub-divided core, about the individual core components 7a, 7b, 7c as exemplified by FIG. 13. If desired, the control winding 17 need extend over only part of the core periphery as is shown in FIG. 16.

Figure 14:
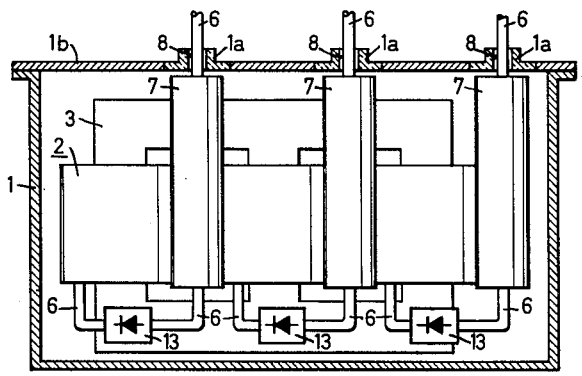
FIG. 14 shows, partly in section, an apparatus similar to that of FIGS. 1 and 2 in which the rectifying or valve devices are mounted near the bottom of the transformer tank.

As explained above, the valve members 13 are preferably mounted in the oil tank beneath the transformer as is shown in FIG. 14 for an apparatus otherwise similar to the one described above with reference to FIGS. 1 and 2.

Figure 15:
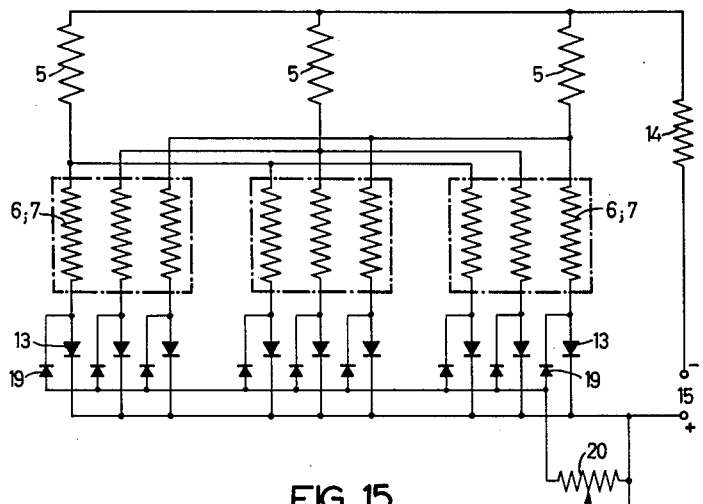
FIG. 15 is a schematic circuit diagram of a magnetic amplifier applicable with apparatus as shown in FIGS. 1 or 14.

The magnetic amplifier system shown in FIG. 15, applicable for instance in accordance with the apparatus of FIG. 14 instead of the circuit connections shown in FIGS. 3 to 7, is completely self-saturating so that no control windings are required. The reverse magnetization of the cores during the current half-wave period in which the rectifier units 13 are non-conducting is effected by auxiliary valves 19 depending upon the setting of a control rheostat 20.

It will be obvious to those skilled in the art, upon a study of this disclosure, that reactors and reactor devices according to our invention can be modified and arranged in various manner and may be embodied in equipment other than the examples particularly illustrated and described herein, without departing from the essence of our invention and within the scope of the claims annexed hereto.

We claim:

1. An electric power-current translating apparatus of the self-saturable transducer type, comprising a tank for insulating coolant, a power transformer and diode devices and saturable reactors all disposed in said tank, said tank having openings for the entrance of power leads, conductors in said tank connecting said respective diode devices and said respective reactors in series to said transformer with some of said conductors passing through said openings, each of said reactors comprising a reactance winding formed by one of said conductors that extends from said transformer to one of said openings, and sleeve-shaped iron core means of approximately rectangular magnetizing characteristic mounted on and surrounding said respective latter conductors, each of said core means forming a completely closed magnetic circuit around an individual one of said latter conductors, said core means being adapted to saturate and desaturate once during each cycle in response to voltages applied by the power transformer across said reactance winding.

2. In current translating apparatus according to claim 1, said reactance-winding conductor extending from said one opening to the transformer side remote from said opening.

3. In current translating apparatus according to claim 1, said reactance-winding conductor comprising a plurality of consecutive portions forming together a meander-shaped structure, and said core having respective portions mounted on said conductor portions in spacial parallel relation to each other.

4. In apparatus according to claim 1, each of said reactors being subdivided into a plurality of portions connected parallel to each other.

5. In apparatus according to claim 1, each of said reactors being subdivided into a plurality of portions connected in series with each other.

6. In apparatus according to claim 1, said transformer having a plurality of phases, and said reactors connected to the different phases of said transformer being grouped together into a plurality of groups, the total current in each of said groups having a constant direct-current value.

7. In apparatus according to claim 1, said transformer having a plurality of phases, and said reactors connected to the different phases of said transformer being grouped together into a plurality of groups, the total current in each of said groups being substantially zero.

8. In apparatus according to claim 1, said valve devices consisting of dry-type rectifier units and being mounted beneath said transformer in said tank and being electrically connected between said transformer and said reactors.

References Cited in the file of this patent
UNITED STATES PATENTS

| | | |
|---|---|---|
| 1,606,777 | Payne | Nov. 16, 1926 |
| 1,606,816 | Stevenson | Nov. 16, 1926 |
| 1,666,661 | Morton | Apr. 17, 1928 |
| 2,165,055 | Kafka | July 4, 1939 |
| 2,565,231 | Hepp | Aug. 21, 1951 |
| 2,594,890 | Ellwood | Apr. 29, 1952 |
| 2,648,810 | White | Aug. 11, 1953 |
| 2,682,632 | Cohen et al. | June 29, 1954 |
| 2,756,368 | Gross et al. | July 24, 1956 |
| 2,759,140 | Lewis | Aug. 14, 1956 |
| 2,820,189 | Uhlmann | Jan. 14, 1958 |
| 2,891,212 | Bingham | June 16, 1959 |
| 2,897,294 | Lipkin | July 28, 1959 |
| 2,971,146 | Diebold | Feb. 7, 1961 |

OTHER REFERENCES

"The Magnetic Amplifier," by V. J. Louden, General Electric Review (March 1953), pages 22–24 relied on.